United States Patent
Le et al.

(10) Patent No.: US 11,743,272 B2
(45) Date of Patent: Aug. 29, 2023

(54) LOW-LATENCY IDENTIFICATION OF NETWORK-DEVICE PROPERTIES

(71) Applicant: International Business Machines Corporation, Armonk, NY (US)

(72) Inventors: Thai Franck Le, White Plains, NY (US); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 486 days.

(21) Appl. No.: 16/989,127

(22) Filed: Aug. 10, 2020

(65) Prior Publication Data

US 2022/0046032 A1 Feb. 10, 2022

(51) Int. Cl.
| | |
|---|---|
| H04L 29/06 | (2006.01) |
| G06N 20/00 | (2019.01) |
| G06N 5/04 | (2023.01) |
| G06N 5/02 | (2023.01) |
| H04L 9/40 | (2022.01) |
| G06N 5/025 | (2023.01) |

(52) U.S. Cl.
CPC ......... *H04L 63/1416* (2013.01); *G06N 5/025* (2013.01); *G06N 5/04* (2013.01); *G06N 20/00* (2019.01)

(58) Field of Classification Search
CPC . H04L 63/1416; H04L 61/30; H04L 63/0227; H04L 63/1408; H04L 63/1433; G06N 5/025; G06N 5/04; G06N 20/00; G06N 3/045; G06N 3/044; G06N 5/046; G06N 3/08
See application file for complete search history.

(56) References Cited

U.S. PATENT DOCUMENTS

| | | | |
|---|---|---|---|
| 7,716,717 | B2 | 5/2010 | Green et al. |
| 9,215,159 | B2 | 12/2015 | Raleigh et al. |
| (Continued) | | | |

FOREIGN PATENT DOCUMENTS

| | | |
|---|---|---|
| CN | 104021348 A | 9/2014 |
| CN | 105007282 A | 10/2015 |
| CN | 107645503 A | 1/2018 |

OTHER PUBLICATIONS

Joshi et al., "A Review of Network Traffic Analysis and Prediction Techniques," Paper, Printed Aug. 3, 2020, 22 pages.

(Continued)

*Primary Examiner* — Joseph P Hirl
*Assistant Examiner* — Thomas A Gyorfi
(74) *Attorney, Agent, or Firm* — Peter J. Edwards

(57) ABSTRACT

A method comprises analyzing, by a machine-learning model, a first network communication with a first set of inputs. The method also comprises inferring, by the machine-learning model and based on the analyzing, that a first device that is a party to the first network communication exhibits a device property. The method also comprises extracting, from the machine-learning model, a first set of significant inputs that had a significant impact on the determining. The method also comprises creating, using the first set of inputs, a rule for identifying the device property. The rule establishes a condition that, when present in a network communication, implies that a party to the network communication exhibits the device property.

20 Claims, 4 Drawing Sheets

(56) References Cited

U.S. PATENT DOCUMENTS

| | | | |
|---|---|---|---|
| 9,306,964 | B2 | 4/2016 | Singhal et al. |
| 11,586,838 | B2* | 2/2023 | He .................... G06F 17/18 |
| 2018/0027006 | A1 | 1/2018 | Zimmerman et al. |
| 2018/0034840 | A1 | 2/2018 | Marquardt et al. |
| 2018/0109494 | A1* | 4/2018 | Yu .................... H04L 63/1441 |
| 2020/0250530 | A1* | 8/2020 | Shen ................ H04L 61/5014 |
| 2021/0067548 | A1* | 3/2021 | Brandt ................ G06N 7/01 |
| 2021/0281582 | A1* | 9/2021 | Akella ................ H04W 12/06 |
| 2022/0321423 | A1* | 10/2022 | Norrman ............ H04L 41/0853 |

OTHER PUBLICATIONS

Pietrzyk, "Methods and Algorithms for Network Traffic Classification," Paper, Apr. 2011, 170 pages.

Bujlow et al., "A method for classification of network traffic based on C5.0 Machine Learning Algorithm," 2012 International Conference on Computing, Networking and Communications (ICNC), 2012, 6 pages.

"Using Deep Learning on Rule-Based Malicious Traffic Detectors to Generate New Malicious-Like Traffic for Layer 4-7 Testing," IP.Com, An IP.com Prior Art Database Technical Disclosure, IP.com No. IPCOM000256739D, IP.com Electronic Publication Date: Dec. 26, 2018.

"Learning Weights for Smart Navigation Planning," IP.Com, An IP.com Prior Art Database Technical Disclosure, IP.com No. IPCOM000252350D, IP.com Electronic Publication Date: Jan. 5, 2018, 40 pages.

"Stylizing Map Based on Examples of Representative Styling," IP.Com, An IP.com Prior Art Database Technical Disclosure, IP.com No. IPCOM000252003D, IP.com Electronic Publication Date: Dec. 13, 2017, 38 pages.

Viola, et al., "Rapid Object Detection using a Boosted Cascade of Simple Features," Accepted Conference on Computer Vision and Pattern Recognition 2001, 9 pages.

Zhang et al., "Robust Network Traffic Classification," IEEE/ACM Transactions on Networking, Aug. 2015, 14 pages, DOI: https://doi.org/10.1109/TNET.2014.2320577.

Haffner et al., "ACAS: Automated Construction of Application Signatures," ACM, Proceedings of the 2005 ACM SIGCOMM workshop on Mining network data (MineNet '05), 6 pages, DOI= http://dx.doi.org/10.1145/1080173.1080183.

Ribeiro et al., "Why Should I Trust You?" ACM, Explaining the Predictions of Any Classifier, Proceedings of the 22nd ACM SIGKDD International Conference on Knowledge Discovery and Data Mining, KDD '16, 2016, 10 pages.

Zilke et al., "DeepRED—Rule Extraction from Deep Neural Networks," Discovery Science 19th International Conference, Oct. 19-21, 2016, 16 pages, http://dx.doi.org/10.1007/978-3-319-46307-0_29.

Schmitz et al., "ANN-DT: An Algorithm for Extraction of Decision Trees from Artificial Neural Networks," IEEE Transactions on Neural Networks, vol. 10, No. 6, Nov. 1999, 10 pages.

Zeiler et al., "Z. M.D. and F. R, Visualizing and Understanding Convolutional Networks," European Conference on Computer Vision, 2014, 16 pages.

Guidotti et al., "A Survey of Methods for Explaining Black Box Models," ACM Comput. Surv., vol. 51, Aug. 2018, 42 pages, https://doi.org/10.1145/3236009.

Bahdanau et al., "Neural Machine Translation by Jointly Learning to Align and Translate," ICLR 2015, arXiv:1409.0473v7, 15 pages.

\* cited by examiner

LOW-LATENCY IDENTIFICATION OF NETWORK-DEVICE PROPERTIES

BACKGROUND

The present disclosure relates to network security, and more specifically, to identifying properties of devices in network communications.

Network traffic (e.g., traffic within a local area network, among separate local area networks, among separate virtual local area networks, and to or from a wide area network) involves sending messages between electronic devices of one or more networks. These electronic devices may include cellular phones, personal computers, Internet of Things (sometimes referred to herein as "IoT") devices, network-infrastructure components, game consoles, computer peripherals, and others. The vast number and large variety of electronic devices on a typical network can cause monitoring traffic on the typical network to be complicated. This make it easier for untrusted actors to gain unauthorized access to networks by taking advantage of network devices that exhibit device vulnerabilities.

Some methods of monitoring network traffic and preventing unauthorized access include establishing rules that dictate whether a communication is allowed into (or out of) a network (or virtual area network) based on, for example, the network address of the communication's origin (e.g., the external Internet, a particular Internet protocol address, and a particular virtual local area network) or the type of the communication (e.g., the communication is in response to an already-established link). These are commonly referred to as firewall rules. Firewall rules can decrease the risk of unauthorized access to a network when sufficient information about the network's organization and population (e.g., what devices/device types are on the network, and how are they grouped) is available, as well as the ability to control those devices (e.g., managing device permissions on a per-device basis). However, some networks are either too large, too unsophisticated, or both, to provide this information or control.

Preventing unauthorized network access can also, in theory, be performed based on the known properties of the devices involved in network communications. By analyzing the properties of a network device to which an incoming communication is directed, or from which an outgoing communication is being sent, network administrators can determine whether vulnerable devices are participating in communications that may put the network at risk. The devices on some networks, however, are numerous and constantly changing, and some users do not have the sophistication to identify those properties.

SUMMARY

Some embodiments of the present disclosure can be illustrated as a method comprising analyzing, by a machine-learning model, a first network communication with a first set of inputs. The method also comprises inferring, by the machine learning model and based on the analyzing, that a first device that is a party to the first network communication exhibits a device property. The method also comprises extracting, from the machine-learning model, a first set of significant inputs that had a significant impact on the determining. The method also comprises creating, using the first set of inputs, a rule for identifying the device property. The rule establishes a condition that, when present in a network communication, implies that a party to that network communication exhibits the device property.

Some preferred embodiments of the illustrated method can also comprise identifying, for each input in the first set of inputs, an input weight. These preferred embodiments may also comprise ranking the input weights of the first set of inputs. These preferred embodiments may also comprise selecting the first set of significant inputs based on the ranking.

Some preferred embodiments of the illustrated method can also comprise analyzing, by the machine-learning model, a second network communication with a second set of inputs. These preferred embodiments may also comprise inferring, by the machine-learning model and based on the analyzing, that a second device that is a party to the second network communication exhibits the device property. In these preferred embodiments, the extracting may further comprise identifying, for each input in the second set of inputs, an input weight, and combining the input weights of the first set of inputs and the second set of inputs.

Some embodiments of the present disclosure can also be illustrated as a system that comprises a processor and a memory in communication with the processor. The memory contains program instructions that, when executed by the processor, are configured to cause the processor to perform a method. The method performed by the processor comprises analyzing, by a machine-learning model, a first set of network communications with a first set of inputs. The method performed by the processor also comprises inferring, by the machine-learning model and based on the analyzing, that each device is a set of devices exhibits a device property. In this example, each device is a party to a network communication in the first set of network communications. The method performed by the processor also comprises extracting, from the machine-learning model, a first set of significant inputs that had a significant impact on the determining. The method performed by the processor also comprises creating, using the first set of inputs, a rule for identifying the device property. The rule establishes a condition that, when present in a set of real-time network communications, implies that a party to that set of real-time network communications exhibits the device property.

In some preferred embodiments of the illustrated system, the machine-learning model is an attention-based model. In these preferred embodiments, the extracting may comprise identifying, for a particular device in the set of devices, a list of attention weights that express the importance of each particular input in the first set of inputs for the inferring for that particular device. In these preferred embodiments, the extracting may also comprise combining, for a particular input for the particular device, the attention weight in the list with the attention weights of corresponding inputs in the set of inputs for the other devices in the set of devices. This combining may result in a combined weight for that input that corresponds to all devices in the set of devices. In these preferred embodiments, the extracting may also comprise comparing the combined weight with other combined weights for other inputs in the set of inputs. In these preferred embodiments, the extracting may also comprise determining, based on the comparing, that the particular input is a significant input. In these preferred embodiments, the extracting may also comprise adding the particular input to the first set of significant inputs.

Some embodiments of the present disclosure can also be illustrated as a computer program product that comprises a computer readable storage medium. The computer readable storage medium has program instructions embodied therewith. The program instructions are executable by a computer to cause the computer to perform the method performed by the system in the above-illustrated embodiment.

In some preferred embodiments of the present disclosure, the program instructions also cause the computer to perform the methods performed by the system in the above-illustrated preferred embodiments.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
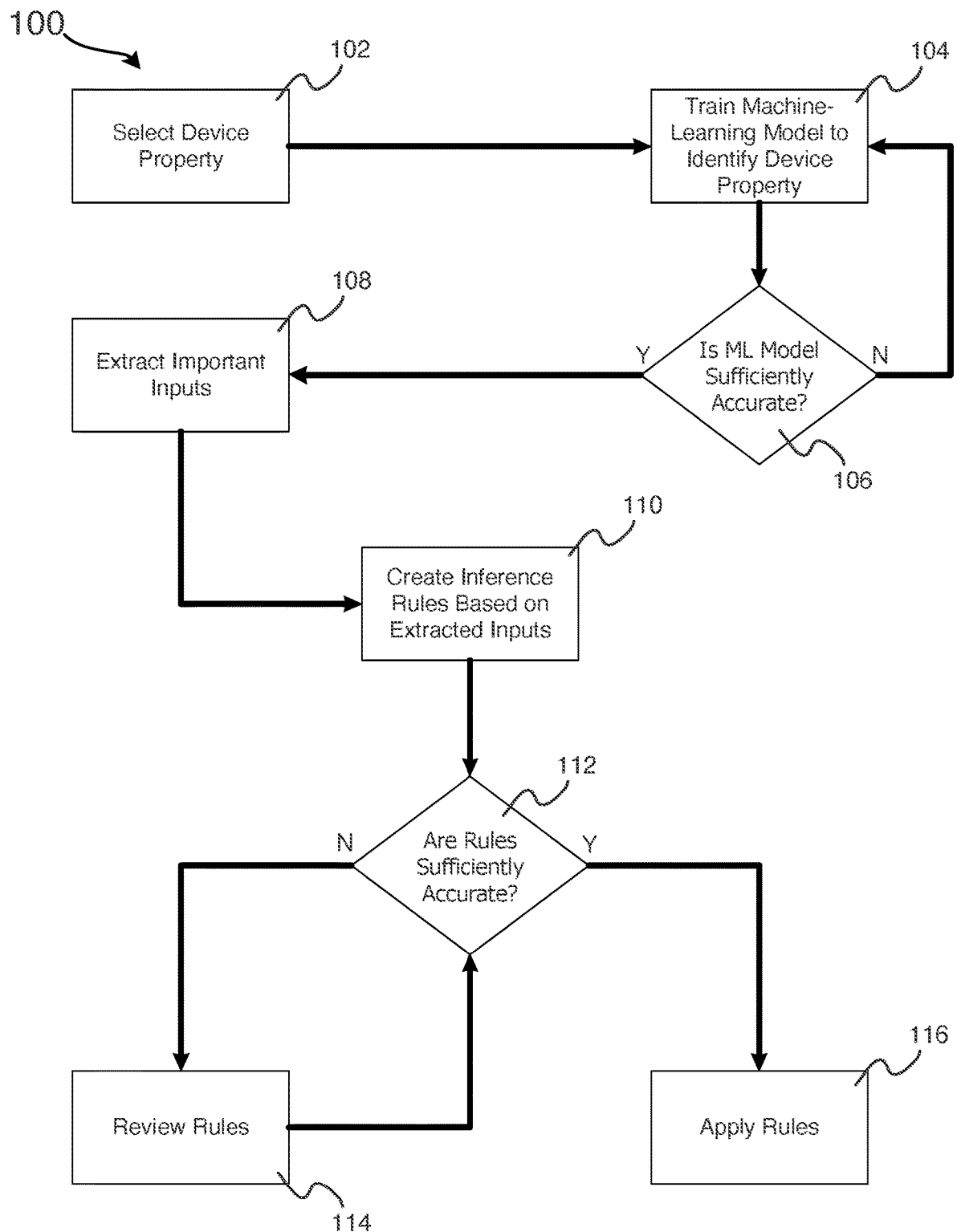
FIG. 1 depicts a method of creating and applying a set of rules to identify a property of a device that is a party to a network communication, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to network security, and more specifically, to identifying properties of devices in network communications. While the present disclosure is not necessarily limited to such applications, various aspects of the disclosure may be appreciated through a discussion of various examples using this context.

Unauthorized access to a particular communication network (e.g., wired local area networks, wireless local area networks, and virtual local area networks) is sometimes accomplished by taking advantage of security vulnerabilities of a device that is authorized for that communications network. Once a vulnerability of a particular device (e.g., a cell-phone model and a security-camera model) or device type (e.g., an IoT device, a device made by a particular manufacturer, a device with a particular processor brand, and a device running particular software) is discovered or suspected, whether publicly, among hacker groups, or others, unauthorized actors (e.g., cybercriminals) may design intrusion attempts that target those devices or device types. If an unauthorized actor is able to communicate with a vulnerable device on a network, the unauthorized actor may be able to take advantage of the vulnerability and gain unfiltered access to the vulnerable device. At that point, the cybercriminal may be able to control the device and use it to access other portions of the network without being detected. In other words, the cybercriminal may be able to use the vulnerable device as a conduit to gain unauthorized access to the network as a whole.

For this reason, it can be beneficial for individuals who maintain communication networks (also referred to herein as "network administrators," which may include, for example, owners of residential networks and employees/contractors engaged to maintain enterprise networks) to monitor and filter incoming and outgoing network traffic to and from network devices that are suspected of suffering from vulnerabilities. In theory, this is possible by filtering network communications based on the properties of the network devices that are parties to those communications. This could include, for example, filtering communications out of a local area network (also referred to herein as a "LAN") to the Internet, filtering communications into a LAN from the Internet, filtering communications between virtual LANs (also referred to herein as vLANS) on a LAN, or filtering communications between devices on a single network (e.g., a single vLAN).

For example, a network administrator may conclude that Internet of Things devices (e.g., smart refrigerators, video doorbells) frequently have outdated, insecure firmware, and thus may wish to limit the ability of an IoT device to contact (or be contacted by) the Internet. Similarly, some network devices may only need to contact the Internet, or other devices on the network, for very specific purposes (e.g., time-server synchronization), and thus a network administrator may wish to limit the ability of those devices to communicate with time-server Internet addresses. Some specific devices (e.g., a particular smartphone model) may be known to be susceptible to attacks of a certain type (e.g., brute-force log-in attempts), and thus a network administrator may wish to block any Internet addresses that repeatedly attempt to log in to one of those specific devices. Further, some devices may only need to communicate throughout the network for very limited purposes, and thus a network administrator may wish to limit those devices from communicating with any other network devices outside of those purposes (for example, a network administrator may wish to prevent a security camera from communicating with any storage server on the network unless the storage server is configured to store that security camera's footage).

However, in order for a network administrator to properly filter network communications based on those device properties, the properties of the network device that is a party of a communication must be known. For very small networks with a typically static set of network devices (e.g., a home network and the network of a small business that does not allow devices not owned by the business on the network), a skilled network administrator may be able to monitor the properties of the devices and filter internet traffic based on those monitored devices.

However, many networks do not fall into these categories. For example, the network administrators of many residential networks are typically home users who do not even know, or know how to identify, all the devices on their residential network, let alone recognize their properties or potential vulnerabilities. Similarly, many enterprise-level networks have a very large population of connected devices, a population of connected devices that significantly changes over time, or both. Thus, for many networks, maintaining an up-to-date knowledge base of the devices on the networks, their properties, and their potential vulnerabilities may be outside the capabilities of the network administrator, and may even be impossible.

For this reason, there are theoretical benefits to automatically, and in real time, inferring the properties of network devices that are parties to network communications. This is theoretically possible, for example, by analyzing the network communications that is intended to be received by or sent to those network devices. For example, when a network-controller device (e.g., a router device, a firewall device) detects a communication sent by a network device (e.g., a request to download a set of instructions such as an executable) to an external IP address, the network-controller device (sometimes referred to herein as a "network controller," a "controller," or a "controller device") may analyze the device's traffic and determine that it is an IoT device (e.g., a smart water heater). If the external IP address to which the communication is intended to be sent is not associated with the manufacturer of that IoT device, the network controller may determine that an unauthorized actor is attempting to install intrusion software on the IoT device and block the communication. By inferring the properties of the IoT device in real time, the network controller could prevent the unauthorized actor from installing the software on the device, even though the properties of the IoT device were not known beforehand.

Inferring the properties of network devices in real time by analyzing the communications of those devices, however, is a computationally intensive activity. Typical generic computer devices have historically struggled to do so, and have required long amounts of time even when successful. However, machine-learning models (e.g., neural-network classifiers, feed-forward networks, recurrent neural networks, long-short-term-memory networks, and attention-based models) may be trained to accurately infer device properties based on the traffic of those devices. In some instances, these machine-learning models (sometimes referred to herein as "ML models) can be configured to infer device properties in near real time. These machine-learning models, for example, can be trained to analyze historical network communications that are labeled based on device type and associate patterns in those network communications with the device-type labels.

For example, a machine-learning model can be fed historical network communications for a network that contains several different device types. The machine-learning model can be configured to analyze each communication, individually or in connection with other communications, and attempt to infer a property of a device from which the communication originated or to which the communication is addressed. These machine-learning models can be configured to infer device properties, for example, based on communication destination, communication origin, communication format, or communication content.

For example, some machine-learning models may be configured to analyze DNS names (e.g., ntp.manufacture.com) in DNS queries that are sent by a network device and infer a device property based on patterns in the DNS names (also referred to herein as "DNS addresses") of those DNS queries. In this way, each communication to a particular DNS name (or DNS names), or a series of communications to a particular DNS name (or names) may be considered an input to the machine-learning model. Some machine-learning models may similarly be configured to analyze the actual traffic content (e.g., the network bytes of the communication) to infer a device property based on patterns observed in the content of the communication. For example, a smart remote of a particular manufacturer may have a particular signature in a request for updated firmware. The actual bytes of these communications may provide the inputs to the machine-learning model. A machine-learning model may therefore be trained to identify patterns of in these inputs, and infer a device property based on those conditions.

The device property the machine-learning model is configured to infer may vary based on the use case in which the machine-learning model is trained (e.g., the capabilities of the network, the security concerns of the network administrators, the population of devices on the network, typical network activity). Some examples of device properties a machine-learning model may be configured to infer include the operating system of a device, the presence of particular software on the device, the device classification (e.g., cell phone, storage server, IoT device), the manufacturer of the device, a version of software on the device (or the age of the software version), and the age of the device. These device properties may be specified in labels (e.g., metadata) that are attached to historical network communications in training data. During training of a machine-learning model, an inferred device property for a device that is a party to a historical communication may be compared to the actual device property in such a label. The configuration of the machine-learning model (e.g., the weights and biases of neural-network neurons) may then be adjusted based on whether the inferred property matched the actual device property.

Once a machine-learning model is sufficiently trained to infer device properties based on traffic (e.g., by communication event, communication content, format of communication), the machine-learning model can typically infer a property of a network device involved in the content with sufficient accuracy for network-security concerns to be addressed. Further, where accuracy of a machine-learning model is insufficient, the machine-learning model can typically be retrained with more historical data (or real-time data) to correct the insufficiency. For example, if a ML model is able to accurately infer that a communication was addressed to a device manufactured by a particular company, but is unable to accurately infer that a communication was addressed by an IoT device, the ML model could be further trained with communications that were intended for or sent from IoT devices on the network.

Typical properly trained machine-learning models, while sufficiently accurate at inferring a device's property based on communications sent by or two that device, are computationally intensive. This computational intensity extends the amount of time required for a ML model to infer a device property. While this computational time may be acceptable for some use cases, applying such a ML model to real-time network communications can result in noticeable, sometimes unacceptable network latency. In use cases in which network speed is particularly important, the detriments of this network latency can outweigh the benefits of the accuracy with which a ML model can infer device properties.

Thus, while ML models are theoretically capable of assisting in inferring device properties for the purpose of filtering network traffic, in practice they are not fast enough to offer a stand-alone solution. For the above reasons, many use cases would benefit from a system that could infer the properties of network devices based on the communications of those network devices with the accuracy of ML models but without the latency introduced by those models.

Some embodiments of the present disclosure address some of the issues identified above by extracting rules for inferring device properties from a machine-learning model that has been trained to infer device properties based on the communications of those devices. In some embodiments, those rules are then analyzed for accuracy, and, if sufficiently accurate, applied to network communications in real time. The rules may then be used to analyze real-time network communications in a computationally light manner. This analysis may allow the fast inference of the properties of the devices involved in those communications, enabling filtering of communications based on device properties without introducing significant network latency.

For example, some embodiments of the present disclosure may configure a machine-learning model (e.g., an attention-based machine-learning model) to analyze a set of network communications and infer a property of a network device that is a party to that communication (e.g., a transmitter of the communication or the intended recipient of the communication). In some embodiments of the present disclosure, the machine-learning model may then analyze historical network communications to train the model. These historical communications may be appended with device-property labels, which provide information on properties of the network device (or devices) involved in the communication. For example, an attention-based machine-learning model may be fed labeled historical communications sent or received by the network for which the attention-based model is being trained. The machine-learning model may be trained by reinforcing the model when the property inference is correct, but adjusting/retraining the model when the property inferred by the model does not match the label.

In some embodiments of the present disclosure, the machine-learning model is trained until it is capable of inferring device properties with an accuracy that is sufficient to meet the security concerns of the network. After that training process, the ML model may be analyzed to identify the reasoning behind the inferences made by the ML model. Specifically, the model may be analyzed to identify the important inputs (e.g., specific domain names, specific communication formats, specific patterns in message bytes) that were particularly influential to the ML model's device-property inferences.

In some embodiments, for example, a wrapper, such as a LIME wrapper, can be applied to a classifier-type machine-learning model as it analyzes communications. Such a wrapper could cause the classifier to repeatedly analyze the same set of inputs, but perform subtle tweaks to the inputs on each repetition. By detecting the tweaks that affect the classifier's inferences and the tweaks that do not, the wrapper can identify the inputs to the classifier that appear to be most significant in the inferences made by the classifier for those communications. For example, if a classifier infers that a communication likely originated from a device made by a particular manufacturer, the wrapper may conclude that the manufacturer's firmware-update server's DNS name was the most-significant input in that inference.

In some embodiments, rather than a classifier-type ML model (e.g., an RNN classifier), an attention-based model may be used to infer properties of network devices. This may be beneficial because, unlike an RNN ML model, the importance of each portion of an input with respect to an attention-based models' conclusion can be examined based on the trained attention-based model's structure. Specifically, the model's attention weights can be used to determine, for a given device property, how important each section of a network communication is when inferring that device property. Thus, for attention-based models, no wrapper should be necessary when identifying the significant inputs for inferring a particular device property. Further, in some embodiments, an algorithm can be used to directly analyze the attention weights and quickly extract the significant inputs.

In some embodiments of the present disclosure, rules by which a device property can be inferred, with or without a ML model, can be formulated based on the extracted inputs that are particularly significant to a ML model's inference of that device property. These rules may take the form of formulaic conditional statements that can easily be parsed by a computer system (e.g., a finite state machine). These conditional statements may specify a device property to infer if the conditions (e.g., the contents of a network communication) are found. For example, in some embodiments, if-then statements may be formulated based on the extracted significant inputs. In some such embodiments, the condition of the if-then statement (i.e., the "if" portion) may be populated with one or more of the significant inputs, and the conclusion of the if-then statement (i.e., the "then" portion) may be populated with a corresponding device property. For example, if a query to a DNS name "ntp.iot-producer.com" is determined to be particularly important in classifying a device as an IoT device made by the manufacturer IoTProducer, a corresponding rule may state that IF DNSname EQUALS "ntp.iotproducer.com," THEN device=IoT AND devicemanufacturer=IoTProducer.

In some embodiments, these rules can be created manually. For example, a network administrator could review the significant inputs for a ML model's inference of a device property and create an if-then rule for that device property. In some instances, this could be beneficial because a network administrator could take into account contextual information for the device or recognize the need for a complex, multi-condition rule. For example, rather than creating a rule that infers that a device is an IoT device if the device queries a particular time-synchronization server, the rule may infer that a device is an IoT device if the device queries a particular time-synchronization server at least 24 times in a day, or if at least 90% of the device's DNS queries are to that particular time-synchronization server.

However, in some use cases, the number of device properties for which to develop inference rules may make manual rule creation undesirable or impractical. Thus, in some embodiments, these rules can be created automatically. For example, an algorithm (e.g., a sliding-window algorithm) could consider the inputs of a model that are above a certain weight (e.g., in the 95th percentile) and generate all if-then sequences where the conditional portion (the "if" portion) is composed of inputs above that certain weight. These conditions could then be associated with the device property that was inferred by the ML model. In other words, the inferred property could be input into the "then" portion of the if-then statements, creating an series of if-then statement that contains different combinations of conditions (e.g., a query to both domain X and domain Y, or a query to domain A or domain B) and an inferred property (e.g., a smartphone by a particular manufacturer).

The configuration of such an algorithm may depend on the nature of the machine-learning model used to identify the significant inputs. For example, if a recurrent neural network were trained to infer device properties, an algorithm may be configured to analyze the output of a wrapper that identifies the key inputs that affected the neural network's conclusion. On the other hand, if an attention-based model were trained to infer device properties, an algorithm could be configured to analyze the attention weights of the model directly. The inputs with high attention weights (e.g., the top 5 inputs, the inputs with weights above a threshold, the inputs with weights above a percentile) could be identified as significant inputs. Either algorithm could then create a proposed set of inference rules based on the identified significant inputs.

In some embodiments, the created inference rules may be tested to gauge their accuracy. This may be beneficial to confirm that the created rules are able to accurately infer the desired device properties before relying on the rules in real-time communications. For example, in some embodiments the rules may be tested on a second set of labeled historical data. The accuracy of the rules could then be determined (e.g., by calculating an f1-score for the rules).

In some instances, however, further historical data may not be available to test the accuracy of inference rules. Thus, in some embodiments the rules could also be tested on real-time communications. In these embodiments, it may be beneficial to simultaneously rely on other methods of inferring or identifying device properties or filtering of network communications (e.g., manually, using a machine-learning model, using traditional firewall rules) to avoid relying on untested, potentially inaccurate inference rules. In some embodiments, the machine-learning model from which the rules were created may also analyze the real-time communications, allowing a comparison between the accuracies of the machine-learning model and the rules with respect to those communications.

If the rules are determined to be sufficiently accurate, they may be applied to real-time communications by a network controller device without the need for significant computational resources. For example, the rules could be applied in real time using, for example, a generic computer on the network or a finite state machine located within a firewall device on the network. The conclusions of the controller device using the rules (i.e., the inferred properties of the network devices that are a party to the analyzed communications) could then be used by the network controller device when making traffic-filtering decisions (e.g., blocking traffic from the Internet, blocking traffic between vLANs, etc.).

If inference the rules are determined to be insufficiently accurate, on the other hand, they may be reviewed by a network administrator. The network administrator may, for example, compare the accuracy of the rules to the output of the ML model, to ensure that the rules reflect the ML model's output. If the inferences made by the ML model and a network controller device utilizing the rules do not match, it is possible that the rules do not capture the decision-making logic of the ML model (e.g., the attention weights). If the inferences made by the ML model and the rules match, however, it is possible that the ML model was not actually sufficiently trained. Thus, depending on the result of the review, the network administrator may decide to reconfigure the ML model (e.g., further train the model with new data), reconfigure the rules (e.g., add or remove inputs from the rules, increase the complexity of the rules based on context of the network communications and others) or both.

FIG. 1 depicts a method 100 of creating and applying a set of rules to infer a property of a device that is a party to a network communication, in accordance with embodiments of the present disclosure. Method 100 may be performed by a computer system, such as computer system 401, that has access to a set of network communications and a machine-learning model that is configured to analyze those network communications. Method 100 could be performed, for example, by a network controller device embedded into a computer system that is also running a machine-learning model (or directing another computer on the network that is running the machine-learning model).

Method 100 is presented as creating and applying rules for inferring a single device property (e.g., device is an IoT device, device is running a particular OS, device is running firmware that has not been updated in two years) of a device that is a party to one or more network communications. However, a similar method could also be applied to create and apply rules for inferring multiple device properties. Similarly, multiple instances of method 100 could be performed to create one or more rules for each device property a network administrator wishes to be able to infer. For example, if a network administrator wishes to be able to infer when a party to a network communication is a mobile phone, when a party to a communication is an IoT device, and when a party to a communication is manufactured by Insecure Devices Incorporated, method 100 could be performed three times (one for each property).

Method 100 begins in block 102, in which a device property is selected. The device property selected in block 102 may be a property that a network administrator has identified as important for network-security concerns. For example, a network administrator may wish to determine whether a device involved in network communications is running an operating system that is known for being insecure, and filter those network communications accordingly. Similarly, a network administrator may wish to determine whether a device involved in network communications is made by a manufacturer that is notorious for including insecure firmware in its devices, or neglecting to update firmware once a device is manufactured. If method 100 is being performed for a network for which almost all network clients are company owned except for employees' personal mobile phones, a network administrator may wish to determine whether a device is a mobile phone. Some network administrators may also wish to determine whether a device is an IoT device, as some network administrators believe that IoT devices are commonly insecure.

Once a device property is selected in block 102, a machine-learning model can be trained, in block 104, to infer the device property based on network communications. This machine-learning model could be previously configured to accept a network communication as an input and output an inference of whether a network device that is a party to that communication exhibits the property selected in block 102. The machine-learning model may be, as discussed previously, an attention-based model, a recurrent neural network, a feed-forward neural network, or others.

Block 104 may include, for example, receiving a set of historical communications in which each communication is appended with a label that states whether or not a device that was a party to that communication exhibited the selected property. For example, if "is an IoT device" was selected as a device property in block 102, the historical data may include a first network communication in which a personal computer transmits an email to the Internet and a second communication in which a IoT lightbulb sends a message to the lightbulb manufacturer's server. In this example, the first network communication may be appended with a label that signifies that no device that is a party to the communication is an IoT device (e.g., "NO," "FALSE," "NOT IoT,"). On the other hand, the second network communication may be appended with a label that signifies that a device that is a party to the communication is an IoT device (e.g., "YES," "TRUE," "IoT,"). The set of historical communications may be referred to herein as "training data."

In some embodiments, different aspects of historical messages may be included in the training data depending on the desired capabilities of the trained machine-learning model or the desired format of the inference rules based on the ML model. In some embodiments, for example, the domain name to which each message was addressed may be included in the training data. Including the domain name may be useful for training the machine-learning model to infer a device property of a network device based on patterns in the domain names with which that network device communicates. In some embodiments, the content of each communication (i.e., the data sent in the communication) may be included in the training data. Including the content of a communication may be useful for training the machine-learning model to infer a device property of a network device based on the patterns in the network (or Internet) activity of a device. In some embodiments, metadata about the format of the communication (e.g., header size, whether the communication is using jumbo packets, whether the message is encrypted, what programming language the message is written in) may be included in the training data. Information about the format of the communication may be useful for training the machine-learning model to infer a device property of a network device based on patterns in the way that device (or all devices on the network of the same manufacturer or operating system, for example) formats network communications. In some embodiments, other aspects of a network communication may be included as well.

In some embodiments, block 104 may include purposefully selecting the aspects of historical message to include in the training data based on the circumstances (e.g., the goals of the network administrator). For example, including absolutely all data that is available and potentially relevant to a set of network communications may increase the likelihood that the resulting machine-learning model is accurate. However, increasing the size and complexity of training data may both increase the time necessary to train the ML model and the time necessary to extract (and the difficulty of extracting) the inputs that were most important to the ML model's inferences. Thus, erring on the side of over inclusion may be detrimental in use cases in which speed and ease of training and rule creation are particularly important. As another example, including only aspects of historical communications that are directly related to a desired rule type (such as inferring a device property based on patterns in the domain names queried by that device) may increase the likelihood that the ML model is trained quickly and that the ML model is trained to make inferences based on the desired inputs. However, excluding data from machine-learning training may decrease the accuracy of the eventual trained model. Similarly, excluding data from the model may decrease the likelihood that useful context is included in the rules created from the trained ML model.

Block 104 includes training the machine-learning model with the training data once it is selected. For example, a labeled network communication (or set of communications) may be input into the machine-learning model, and the machine-learning model may provide an output that infers whether a network device that is party to that communication (or communications) exhibits the device property that the ML model is configured to make inferences regarding. Early in the training process, the ML model may frequently make incorrect inferences, causing the model to be retrained (including, for example, adjusting biases or attention weights). The same network communication or a new network communication may then be input to the ML model again.

As the ML model is trained in block 104 (or after the ML model is believed to be sufficiently trained), a controller device may determine in block 106 whether the model is sufficiently accurate for the purposes of the network. In some embodiments, for example, a computer system overseeing method 100 may monitor the developing accuracy of the ML model as it is being trained in block 104, and consistently compare that accuracy to a desired accuracy threshold. This may be beneficial because it may enable the computer system to stop the training process in block 104 as soon as the ML model is sufficiently trained, avoiding unnecessary time and resources being spent on overtraining the model for the training data. In some embodiments, the training process in block 104 may periodically stop, allowing the accuracy of the ML model to be examined in block 106. This may involve, for example, testing the ML model on the previous training data or new training data. Testing the ML model with new training data may be beneficial because it may prevent the ML model from being overtrained on the previous training data without being flexible enough to make accurate inferences for other training data (or real-time data).

The precise metrics used to gauge the accuracy of the ML model may be chosen based on the circumstances and network-administrator preferences. Some examples include the raw accuracy (e.g., total correct inferences divided by total inferences), the precision of the model (e.g., correct positive inferences divided by the total positive inferences, correct negative inferences divided by the total negative inferences), recall (e.g., true positive inferences divided by the sum of true positive inferences and false negative inferences), and F1 score (a combination of precision and recall).

If the machine-learning model is determined, in block 106, to be insufficiently accurate, a. computer system (or network administrator) overseeing method 100 may return to block 104 to continue training the machine-learning model. In some embodiments, this may simply involve not interrupting the training process, allowing the continual training of the ML model. However, in some embodiments (such as embodiments in which the training process was interrupted at block 106), returning to block 104 may include adding new training data to the training process, which may increase the flexibility of the ML model.

If the machine model is determined, in block 106, to be sufficiently accurate, however, a computer system overseeing method 100 may proceed to block 108 in which the important inputs to the ML model's inferences are extracted. As discussed previously, the specific process performed in block 108 may depend upon the structure of the machine-learning model, the nature of the training data, and the preferences regarding the inference rules to be created from the important inputs.

For example, if the machine-learning model trained in block 104 is a recurrent neural network, block 108 may include applying a wrapper, such as a LIME wrapper, to the ML model to monitor the impacts that various tweaks to the inputs to the ML model have on the ML model's inferences. On the other hand, if the machine-learning model trained in block 104 is an attention-based model, block 108 may simply involve querying the attention weights applied to each input of the ML model.

Further, if the training data used to train the ML model in block 104 is complex, the important inputs extracted at block 108 may take various forms. For example, if an ML model is trained on all available data relating to a set of network communications, the extracted inputs may include any of that data (e.g., communication recipient, time of communication, how often that communication is sent, format of the communication, and others). On the other hand, if an ML model is trained only on the DNS name that a networking device queries, the extracted inputs would only include the DNS name (or DNS names) that was influential in inferring whether that device did or did not exhibit the device property.

In some instances, an important input may be an input that, when recognized by a ML model, causes the ML model to infer a particular device property based on that input alone. For example, an important input may take the form of a domain name that, if a network device queries, the ML model infers that the device is an IoT device. However, in some instances an important input may be an input that causes the ML model to infer a particular device property only when that important input is recognized together with other inputs. For example, in some instances an important input may be a series of bytes in a header of a network communication. When recognized in isolation, that series of bytes may not be sufficient to create an inference of a device property. However, when the ML model recognizes that series of bytes on the same day that it also recognizes a second series of bytes in a second network communication from the same network device, the ML model may be able to accurately infer a device property of the network device.

Further, the implementation preferences of a network administrator may also impact the important inputs that are extracted in block 108. In some use cases, for example, a network administrator may wish that only the most important input is extracted for rule creation. In some use cases, on the other hand, a network administrator may wish that the five most important inputs are extracted.

The device property that is being inferred may also affect the inputs that are determined to be important. The inputs that may be particularly useful for inferring that a device is an IoT device may be completely different than the inputs that may be useful for inferring that a device is a device made by a particular manufacturer or for inferring that a device is a personal mobile phone.

In some embodiments, extracting the important inputs may also include extracting a weight that numerically represents the significance that input had on the ML model's inference. For example, if the ML model trained in block 104 is an attention-based model, each important input extracted may also be appended with the attention weight for that input.

Thus, if a machine-learning model is trained in block 104 to analyze a set of DNS names queried by a network device, the important inputs extracted at block 108 may take the form of a list of (1) the ten DNS names that, due to their presence in the input data, were most influential in the ML model's inference, and (2) for each of the ten DNS names, the numerical weight applied to that DNS name.

Once the important inputs are extracted in block 108, a set of inference rules are created in block 110 based on those extracted inputs. As previously discussed, these inference rules could take the form of if-then statements that contain a condition and a conclusion (here, an inference) based on that condition. For example, a created rule may take the form of a statement with the condition "if 'DNS name' equals 'ntp.manufacturer.com' and 'device-metrics-us.manufacturer.com'" and the conclusion "then 'devicemanufacturer' equals 'manufacturer.'" This rule, when parsed by a computer (such as a generic computer system or a finite state machine), would conclude that a network device is manufactured by "manufacturer" when that device queries both "ntp.manufacturer.com" and "device-metrics-us.manufacturer.com."

In some embodiments, the inference rules created at block 110 may be created manually (e.g., by a network administrator) or automatically. In use cases with a simple, short set of extracted important inputs, automatically creating rules may result in a manageable set of rules. For example, if the top three DNS names are extracted at block 108, block 110 may include automatically incorporating each of those DNS names into a rule that concludes that the device property is exhibited if that single DNS name is present. Block 110 may also incorporate each possible pair of DNS names combined by an "AND" operator (resulting in a condition that requires both names), an "OR" operator (resulting in a condition that requires either or both DNS names), and an "XOR" operator (resulting in a condition that requires one DNS name but is not met if both DNS names are present). In some embodiments, all three DNS names may be combined into a condition, such as a condition that requires the first two DNS names but requires that the third DNS name be not present. The resulting set or inference rules may include 25 rules or less, making choosing an accurate inference rule (or rules) manageable.

In some embodiments, the extracted inputs may allow for more complex inference rules to be created. For example, if the important inputs extracted at block 108 include time stamps for network communications, rules created at block 110 may make use of those timestamps. For example, a rule could be created that includes a condition for a network device to send a communication to an IP address between a particular time period (e.g., between 2 AM and 4 AM) or at a certain frequency (e.g., at least 40 times per day). In embodiments in which most or all data related to network communications is included in training data, the extracted inputs may allow even more complex rules. For example, sequence mining algorithms (such as a PrefixSpan algorithm) could collect sequences of events within the important inputs extracted at block 108. These rules could be based on, for example, series of communications sent to particular sequences of destinations, or series of communications sent with particular sequences of content.

In some use cases, a network administrator may prefer to prevent an initial set of rules created at block 110 from being overly complicated. This may potentially avoid unnecessary rule testing and analyzing in later blocks of method 100. For this reason, block 110 may default to creating simple rules (e.g., simple if-then statements) at first. In some embodiments, it may also be preferred for the rules to be created or reviewed by a network administrator. A network administrator may be capable of identifying context within the inputs that a rule-creating algorithm cannot. For this reason, a network administrator may be able to eliminate rules that the network administrator has reason to believe would be inaccurate, even if they were created using important inputs (for example, rules that require a device to query both a manufacturer's ntp server and a competing manufacturer's ntp server).

After the set of inference rules is created in block 110, the rules may be tested for accuracy in block 112. In some embodiments, testing the inference rules may include applying the inference rules to a new set of data using a computer system (such as a generic computer processor). For example, a computer may load the inference rules into memory, receive a new network communication, and compare that network communication with the text in the "conditions" of the inference rule. If the data in the network communication matches the condition, the computer would infer that a device that is a party to the communication exhibits the device property. For example, if the condition is "DNS name=ntp.smarttoaster.com" and the network communication is a query to ntp.smarttoaster.com, the computer would conclude that a device that is a party to the communication (here, the sending device) exhibits the device property (e.g., that the device is a smart toaster).

Using a new set of data, rather than the prior training data, in block 112 may beneficially decrease the likelihood that the rules are well suited for the prior historical training data while being poorly suited for making inferences based on data that differs from the prior historical training data. In other words, by testing the created inference rules on new data, method 100 can avoid the data being "overly trained" to the prior historical training data. In some embodiments, a mixture of new data and old training data (e.g., 80% old training data, 20% new data) could be used for testing the rules.

The new data used in block 112 may take the form of a second set of historical training data or real-time data from real-time communications in the network. If a second set of historical training data is used, the conclusions of the computer applying the second set of training data to the created rules may be able to compare its inferences with the labels in the training data, or with the trained ML model's inferences based on that second set of training data. However, if real-time data is used for the new set of data, using the machine-learning model trained in block 104 to analyze the new set of data as well may be particularly beneficial, because the real-time data would be unlikely to be labeled. The inferences of the computer running the inference rules and the machine-learning model may then be compared for accuracy purposes.

In some embodiments, determining whether the created inference rules are sufficiently accurate in block 112 may include performing similar accuracy calculations as were performed on the trained ML model in block 106. For example, the raw accuracy, the precision, recall, F1 score, or a combination thereof could be calculated for each created rule. These measurements could then be compared to one or more accuracy thresholds (e.g., a precision threshold, an F1-score threshold) in block 112.

If the rules are determined to be not sufficiently accurate in block 112, the rules are reviewed in block 114. In some embodiments, block 114 may involve a human reviewer (e.g., a network administrator) analyzing the rules for the source of error. For example, a human review could review the rules for potential parsing errors. The human reviewer could also review context within the training data that may explain either the inaccuracy or be useful for avoiding the inaccuracy. The human reviewer could review the important inputs that were extracted at block 108 for potential errors (e.g., an input based on content of a network communication that is highly likely to be found in almost all communications on the network).

In some instances, review of the rules in 114 may illustrate that the rules could be improved. For example, if a rule created at block 110 takes the form of an if-then statement that infers a device property if a communication is sent to a particular DNS name, and if block 112 determines that that rule results in an unacceptable number of false-positive references, reviewing the rules at block 114 may reveal that added context from the training data suggests amending the rule to infer the device property if a communication is sent to the particular DNS name at least 6 times in 24 hours. Amending the rules may be performed by increasing the complexity of a rule-creating algorithm (e.g., moving from a simple algorithm that plugs one domain into an if-then rule) to a more complex algorithm that considers timing of communications, influence of other network communications, sequences between communications (e.g., a PrefixSpan algorithm) or all of the above. Amending the rules at block 114 could also be performed by a human reviewer, such as a network administrator.

In some instances, it may be possible that the rules are determined to be inaccurate in block 112 because the machine-learning model on which the rules are based (or the important inputs on which the rules are based) are not accurate for the new data used in block 112. In these instances, method 100 may include returning to block 104 from block 114, at which point the machine-learning model could then be retrained. However, in most instances, performing 104 with a sufficiently large training set and setting the accuracy threshold appropriately high in block 106 should prevent inaccuracies at block 112 due to a poorly trained network. For this reason, block 114 will typically proceed to block 112, and is illustrated as such here.

After review and modification of the rules, block 112 again determines whether the rules are sufficiently accurate. This subsequent iteration of block 112 may involve the same analysis as was discussed previously. If block 112 determines that the rules are sufficiently accurate, the rules can then be applied in block 116. In some embodiments, block 116 could involve adding the created rule to an "accepted" rule list for later potential application to real-time network traffic. In some embodiments, block 116 could include applying the rule to real-time live data. As has been discussed, this could be performed by a generic computer with a processor configured to compare live network communications with the conditions of the created rules (for example, using a string comparison). For most created rules, a simple finite state machine may be sufficient for this comparison. When these rules are applied to real-time network communications, the inferences made based on these rules can be used when making manual or automated traffic-filtering decisions (e.g., decisions of whether to block traffic to an IoT device or prevent a device with a vulnerable operating system from contacting a VLAN that hosts a network controller device or a VLAN with sensitive storage. In some embodiments, this rule application may be performed, for example, on a network firewall device or router device.

Figure 2:
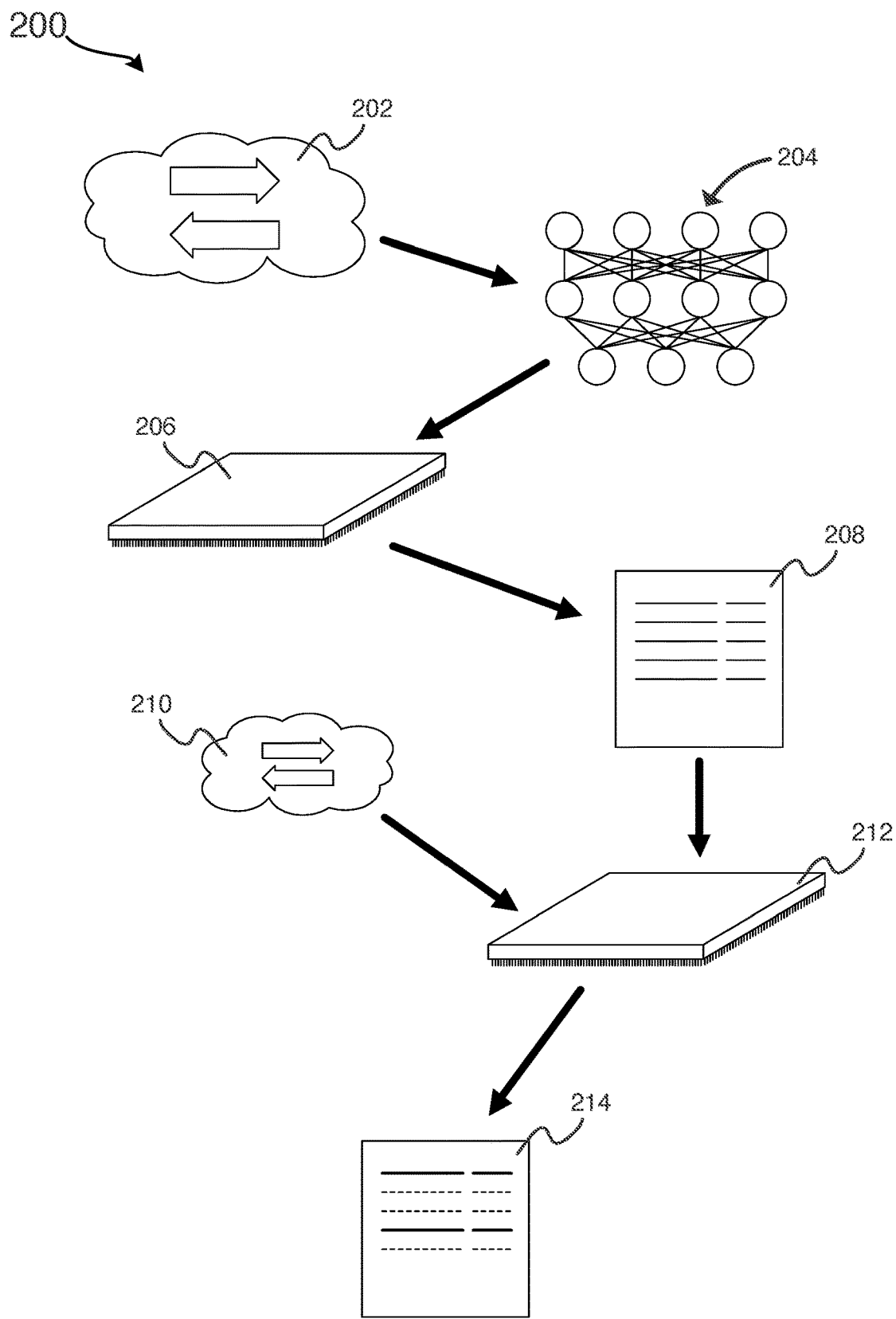
FIG. 2 depicts a graphical abstraction of a system for developing and applying a set of rules to identify a property of a device that is a party to a network communication, in accordance with embodiments of the present disclosure.
Figure 3:
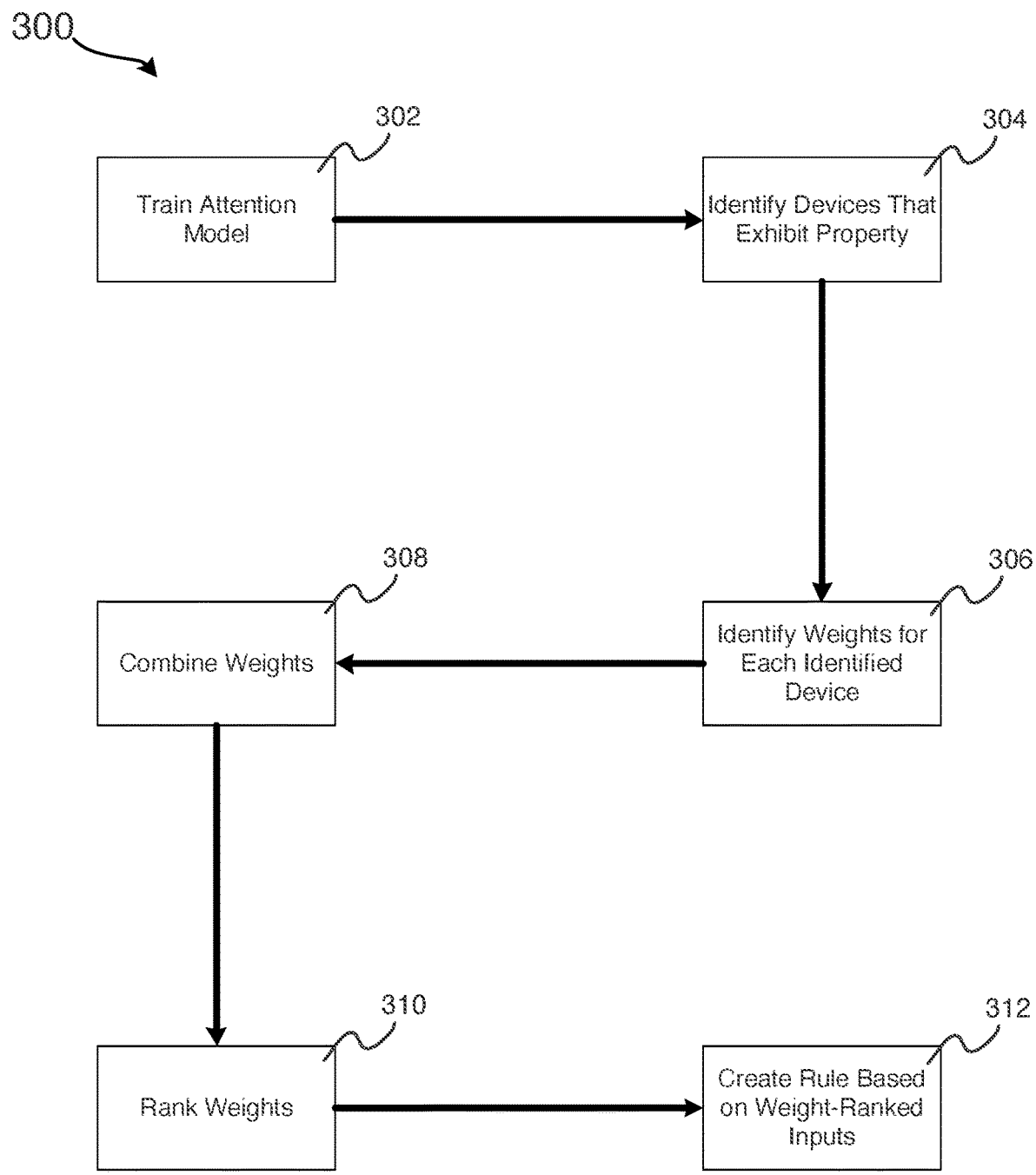
FIG. 3 depicts a method of extracting rules to infer a property of a device from a machine-learning model that is also trained to infer that property, in accordance with embodiments of the present disclosure.

For ease of understanding, FIG. 2 depicts a graphical abstraction 200 of a system for developing and applying a set of rules to infer a property of a device that is a party to a network communication, in accordance with embodiments of the present disclosure. The purpose of FIG. 2 is to provide a simplified view of the inputs and outputs of the processes of the present disclosure. The components of and process suggested by graphical abstraction 200, therefore, are simplified abstractions, and are not intended to be precise representations of the embodiments of the present disclosure.

In graphical representation 200, a set of network communications 202 is input into machine-learning model 204 in order to train the machine-learning model to infer a device property of a device that is a party to those network communications. In some embodiments, this device property would have been previously selected, and the content of network communications 202 would have been selected for those training purposes. Thus, network communications 202 may contain labels that imply whether a party to the communications exhibited the device property. The content of network communications 202 may be selected to target the reasoning for the inferences made by machine-learning model 204. For example, if a network administrator wishes to train machine-learning model 204 to make inferences based on the actual bytes of network communications, rather than, for example, information about the sender or intended recipient, then network communications 202 may be reduced to only contain message content, rather than any additional communication data.

Once machine-learning model 204 is properly trained to infer device properties based on network communications 202, machine-learning model 204 is itself analyzed by computer system 206. Computer system 206 may be any computer that is capable of analyzing machine-learning model 204 to extract the inputs that are significant in the inferences made by machine-learning model 204. For example, if machine-learning model 204 is a recurrent neural network, computer system 206 may be a system with a processor capable of running a LIME wrapper. If machine-learning model 204 is an attention-based network, computer system 206 may be a system with a processor capable of identifying and ranking the attention weights of machine-learning model 204. In some embodiments, computer system 206 may be a computer system hosted on the network that is responsible for managing network communications (e.g., a network controller device or a computer that runs network controller software).

Computer system 206 may then create inference rules 208 based on the extracted important inputs. In some embodiments, computer system 206 may, for example, utilize a single algorithm that is capable of both extracting the inputs and formulating inference rules 208 (illustrated here as a list of five conditions on the left and a corresponding list of five inferences on the right). This may be beneficial when extracting important inputs from an attention-based model, as the attention weights may be easily accessible for an algorithm that specializes in rule creation. In some embodiments, a rule-creation algorithm may also obtain the extracted important inputs from a separate wrapper that was applied to neural network 204.

Once inference rules 208 are created, they are applied to a new set of network communications 210 by computer system 212. In some embodiments, new set of network communications 210 may be an additional set of training data for the purpose of validating inference rules 208. In other embodiments, new set of network communications 210 may be live, real-time network traffic. Computer system 212 could, in some embodiments, be the same computer system as computer system 206 (e.g., a network controller device) or different computer system. In some embodiments, computer system 212 may be any computer system with that is capable of performing a string comparison between the conditions in inference rules 208 and the set of network communications 210.

Computer system 212 may output inferences 214. As illustrated, inferences 214 illustrates that computer system 212 has found two conditions to be satisfied (i.e., the first condition and the fourth condition) as met, and thus may infer that the corresponding first and fourth device properties are exhibited by a device that is party to network communications 210. As presented, FIG. 2 illustrates an example in which two device properties were inferred. For example, computer system 212 may infer that a device that is party to network communications 210 is an IoT device (e.g., the first condition) with firmware that is over one year old (e.g., the, forth condition). In some embodiments of the present invention, however, only one device property per set of rules may be inferred.

As has been previously discussed, extracting important inputs and creating rules based on those inputs can vary based on the circumstances (e.g., ML model properties, network administrator preferences). For this reason and for the sake of understanding, FIG. 2 is presented as an example method 300 of extracting rules to infer a property of a device from a ML model that is also trained to infer that property, in accordance with embodiments of the present disclosure. Method 300 may be performed by a computer system, such as computer system 401, that is configured to monitor and control network communications on a network (e.g., a network controller device or a system hosting network-controller software).

Method 300 begins in block 302, in which an attention-model machine-learning model is trained to infer whether a device that is party to one or more network communications exhibits a pre-selected device property, based on those network communications. Details on block 302 can be found throughout the disclosure. Particular examples can be found with respect to block 104 of FIG. 1 and machine-learning model 204 of FIG. 2. Once the attention-based model is trained in block 302, input extraction can begin in block 304.

In block 304, the devices that were inferred by the attention-based model are identified. For example, each set of communications analyzed by the attention-based model in the data set could be assigned a unique, hypothetical network device. For each set of communications for which the attention-based model inferred the presence of the pre-selected property, the hypothetical device could be added to an "identified" list of devices in block 304. For example, if the attention model analyzed 10 sets of communications, and inferred that the pre-selected property (e.g., IoT device) was present in 5 of those sets, block 304 may result in identifying 5 unique devices that exhibit the pre-selected property (here, the property of being an IoT device). This may be true even if the actual network from which the 10 sets of communications were sourced were only composed of two devices, only one of which was an IoT device. For the purpose of method 300, treating each set of communications as corresponding to a unique device may be sufficient.

For each device identified in block 304 (e.g., each hypothetical device), the attention weights that were assigned to each input (e.g., the header of a communication, the address to which a communication is sent) is identified in block 306. In other words, for each set of communications, block 306 determines the relevance that each aspect of the communications had on the inference that the corresponding device exhibited the pre-selected property. In an attention-based model, these attention weights take the form of numerical expressions of importance applied to each input, and can be derived directly from the structure of the model. Thus, block 306 may take the form of extracting those attention weights directly from the model for each device identified in block 304, resulting in a list of attention weights for each identified device. In some embodiments, for example, this list may take the form of a list of DNS names to which communications in the set of communications were sent, along with, for each DNS name, a numerical number that expressed the impact the presence of that DNS name had on the inference.

In block 308, the attention weights that were identified in block 306 are summed for each device. For example, if 5 devices were identified in block 304, and if the attention-based model had attention weights of 0.2, 0.1, 0.1, 0.3, and 0.2 for the DNS name firmware_fetch.manufacturer.com for those 5 devices respectfully, block 308 may include adding those attention weights together, resulting in a combined weight of 0.9 for the DNS name firmware_fetch.manufacturer.com for the set of identified devices. This summing process may be repeated for each of the inputs for which attention weights are available. For example, if the data on which the attention model was trained contains queries to 30 DNS names, block 308 may result in a list of 30 combined weights. Each of these combined weights would express the total attention weight given to that DNS name across all 5 of the identified devices.

Once the combined weights are created in block 308, the combined weights are ranked in block 310. This may include, for example, ordering the combined weights in a descending order. In other words, the largest combined weight would be listed first, and the smallest combined weight would be listed last. Because each combined weight corresponds to the sum of the weights for a single input across all the devices that were identified in block 304, the results of block 310 provide a list of the inputs that were the most influential to the attention-based models inferences across all identified devices.

With the ranked list of combined attention weights, a computer system could create, in block 312, inference rules based on the most influential inputs. For example, an algorithm could automatically obtain the 5 most influential inputs and insert them into simple if-then statements, the "if" condition of which is the presence of the influential input, and the "then" condition of which is the inference of the device property. As discussed previously, these created rules may, in some embodiments, be more complicated and incorporate more context (e.g., requiring the presence of two ranked inputs to create a device-property inference, requiring the presence of an input at least X times over Y time period, requiring a specific sequence of inputs). The rules that are created as part of method 300 could then be tested for accuracy by any method discussed herein. If accurate, the created rules could be applied to real-time network communications.

Figure 4:
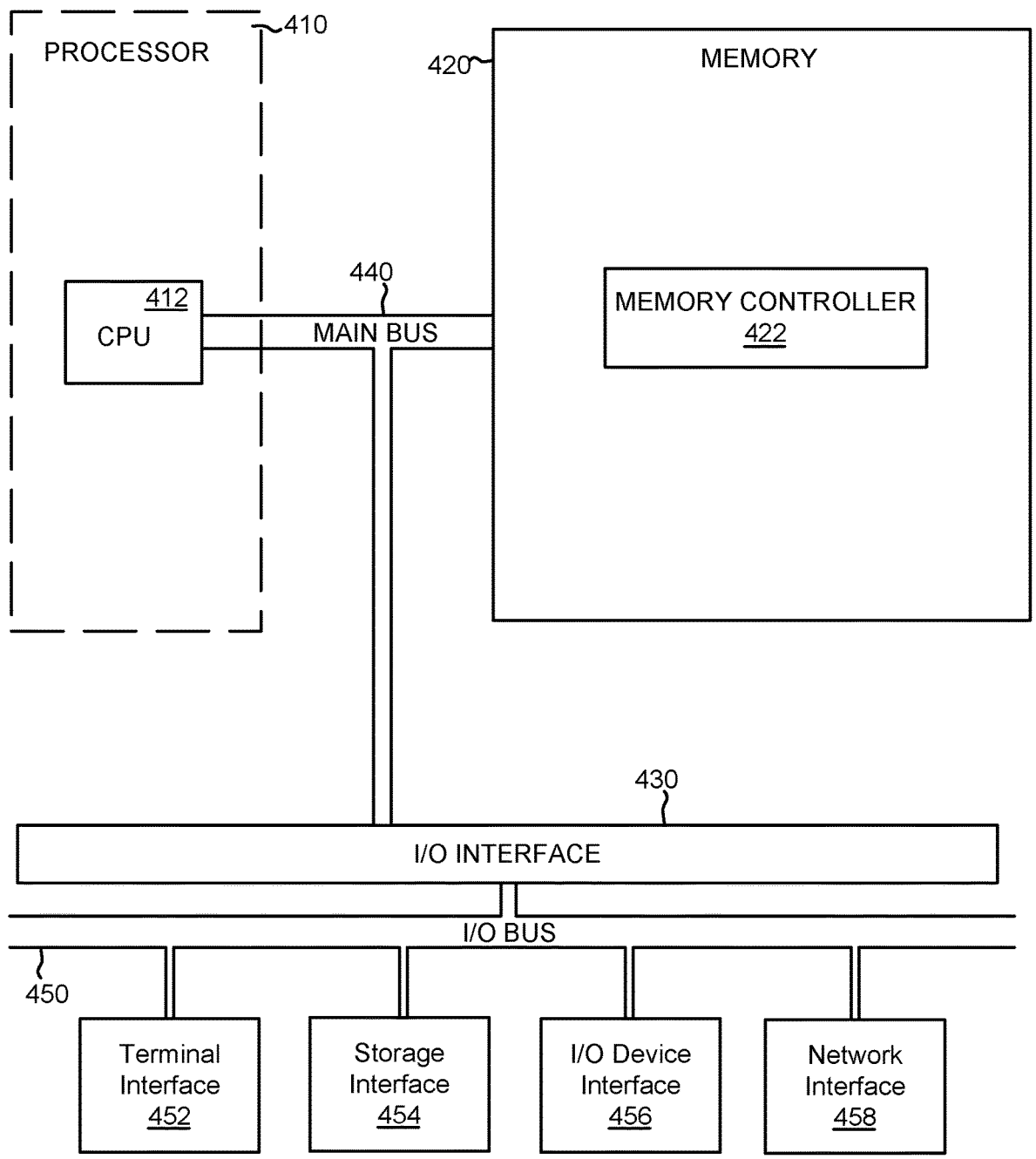
FIG. 4 depicts the representative major components of a computer system that may be used in accordance with embodiments.

FIG. 4 depicts the representative major components of an example Computer System 401 that may be used in accordance with embodiments of the present disclosure. The particular components depicted are presented for the purpose of example only and are not necessarily the only such variations. The Computer System 401 may include a Processor 410, Memory 420, an Input/Output Interface (also referred to herein as I/O or I/O Interface) 430, and a Main Bus 440. The Main Bus 440 may provide communication pathways for the other components of the Computer System 401. In some embodiments, the Main Bus 440 may connect to other components such as a specialized digital signal processor (not depicted).

The Processor 410 of the Computer System 401 may include one or more CPUs 412. The Processor 410 may additionally include one or more memory buffers or caches (not depicted) that provide temporary storage of instructions and data for the CPU 412. The CPU 412 may perform instructions on input provided from the caches or from the Memory 420 and output the result to caches or the Memory 420. The CPU 412 may include one or more circuits configured to perform one or methods consistent with embodiments of the present disclosure. In some embodiments, the Computer System 401 may contain multiple Processors 410 typical of a relatively large system. In other embodiments, however, the Computer System 401 may be a single processor with a singular CPU 412.

The Memory 420 of the Computer System 401 may include a Memory Controller 422 and one or more memory modules for temporarily or permanently storing data (not depicted). In some embodiments, the Memory 420 may include a random-access semiconductor memory, storage device, or storage medium (either volatile or non-volatile) for storing data and programs. The Memory Controller 422 may communicate with the Processor 410, facilitating storage and retrieval of information in the memory modules. The Memory Controller 422 may communicate with the I/O Interface 430, facilitating storage and retrieval of input or output in the memory modules. In some embodiments, the memory modules may be dual in-line memory modules.

The I/O Interface 430 may include an I/O Bus 450, a Terminal Interface 452, a Storage Interface 454, an I/O Device Interface 456, and a Network Interface 458. The I/O Interface 430 may connect the Main Bus 440 to the I/O Bus 450. The I/O Interface 430 may direct instructions and data from the Processor 410 and Memory 420 to the various interfaces of the I/O Bus 450. The I/O Interface 430 may also direct instructions and data from the various interfaces of the I/O Bus 450 to the Processor 410 and Memory 420. The various interfaces may include the Terminal Interface 452, the Storage Interface 454, the I/O Device Interface 456, and the Network Interface 458. In some embodiments, the various interfaces may include a subset of the aforementioned interfaces (e.g., an embedded computer system in an industrial application may not include the Terminal Interface 452 and the Storage Interface 454).

Logic modules throughout the Computer System 401—including but not limited to the Memory 420, the Processor 410, and the I/O Interface 430—may communicate failures and changes to one or more components to a hypervisor or operating system (not depicted). The hypervisor or the operating system may allocate the various resources available in the Computer System 401 and track the location of data in Memory 420 and of processes assigned to various CPUs 412. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   analyzing, by a machine-learning model, a first network communication with a first set of inputs;
   inferring, by the machine-learning model and based on the analyzing, that a first device that is a party to the first network communication exhibits a device property;
   extracting, from the machine-learning model, a first set of significant inputs that had a significant impact on the inferring; and
   creating, using the first set of inputs, a rule for identifying the device property, wherein the rule establishes a condition that, when present in a network communication, implies that a party to that network communication exhibits the device property.

2. The method of claim 1, wherein the extracting comprises:
   identifying, for each input in the first set of inputs, an input weight;
   ranking the input weights of the first set of inputs; and
   selecting the first set of significant inputs based on the ranking.

3. The method of claim 2, further comprising:
analyzing, by the machine-learning model, a second network communication with a second set of inputs; and
inferring, by the machine-learning model and based on the analyzing, that a second device that is a party to the second network communication exhibits the device property;
wherein the extracting further comprises:
identifying, for each input in the second set of inputs, an input weight; and
combining the input weights of the first set of inputs and the second set of inputs.

4. The method of claim 1, wherein the machine-learning model is an attention-based model.

5. The method of claim 1, wherein the rule is an if-then statement.

6. The method of claim 1, further comprising:
applying the rule to a real-time network communication;
detecting the condition in the real-time network communication;
inferring, based on the detecting, that a second device that is party to the real-time network communication exhibits the device property; and
blocking, based on the identifying, the real-time network communication.

7. The method of claim 1, wherein the first set of significant inputs comprises a domain name.

8. A system comprising:
a processor; and
a memory in communication with the processor, the memory containing program instructions that, when executed by the processor, are configured to cause the processor to perform a method, the method comprising:
analyzing, by a machine-learning model, a first set of network communications with a first set of inputs;
inferring, by the machine-learning model and based on the analyzing, that each device is a set of devices exhibits a device property, wherein each device is a party to a network communication in the first set of network communications;
extracting, from the machine-learning model, a first set of significant inputs that had a significant impact on the inferring; and
creating, using the first set of inputs, a rule for identifying the device property, wherein the rule establishes a condition that, when present in a set of real-time network communications, implies that a party to that set of real-time network communications exhibits the device property.

9. The system of claim 8, wherein the machine-learning model is an attention-based model, and wherein the extracting comprises:
identifying, for a particular device in the set of devices, a list of attention weights that express the importance of each particular input in the first set of inputs for the inferring for that particular device;
combining, for a particular input for the particular device, the attention weight in the list with the attention weights of corresponding inputs in the set of inputs for the other devices in the set of devices, resulting in a combined weight for that input that corresponds to all devices in the set of devices;
comparing the combined weight with other combined weights for other inputs in the set of inputs;
determining, based on the comparing, that the particular input is a significant input; and
adding the particular input to the first set of significant inputs.

10. The system of claim 9, wherein the particular input for the particular device is a DNS name that the device queried, and wherein the corresponding inputs for the other devices in the set of devices are the DNS name that those other devices queried.

11. The system of claim 10, wherein the rule comprises inferring that a network device exhibits the device property if the network device queries the DNS name.

12. The system of claim 8, wherein the rule comprises inferring that a network device exhibits the device property if the network device queries the DNS name and a second DNS name.

13. The system of claim 8, wherein the first set of significant inputs comprises a particular sequence of bytes in a real-time network communication.

14. The system of claim 8, wherein the first set of significant inputs comprises a DNS name, and the condition comprises querying the DNS name at least a threshold number of times over a particular time period.

15. A computer program product, the computer program product comprising a computer readable storage medium having program instructions embodied therewith, the program instructions executable by a computer to cause the computer to:
analyze, by a machine-learning model, a first set of network communications with a first set of inputs;
infer, by the machine-learning model and based on the analyzing, that each device is a set of devices exhibits a device property, wherein each device is a party to a network communication in the first set of network communications;
extract, from the machine-learning model, a first set of significant inputs that had a significant impact on the inferring; and
create, using the first set of inputs, a rule for identifying the device property, wherein the rule establishes a condition that, when present in a set of real-time network communications, implies that a party to that set of real-time network communications exhibits the device property.

16. The computer program product of claim 15, wherein the machine-learning model is an attention-based model, and wherein the extracting comprises:
identifying, for a particular device in the set of devices, a list of attention weights that express the importance of each particular input in the first set of inputs for the inferring for that particular device; and
combining, for a particular input for the particular device, the attention weight in the list with the attention weights of corresponding inputs in the set of inputs for the other devices in the set of devices, resulting in a combined weight for that input that corresponds to all devices in the set of devices.

17. The computer program product of claim 16, wherein the particular input for the particular device is a DNS name that the device queried, and wherein the corresponding inputs for the other devices in the set of devices are the DNS name that those other devices queried.

18. The computer program product of claim 15, wherein the rule comprises inferring that a network device exhibits the device property if the network device queries the DNS name.

19. The computer program of claim 15, wherein the rule comprises inferring that a network device exhibits the device property if the network device queries the DNS name and a second DNS name.

20. The computer program of claim 15, wherein the first set of significant inputs comprises a DNS name, and the condition comprises querying the DNS name at least a threshold number of times over a particular time period.

* * * * *